(12) United States Patent
Hirokawa et al.

(10) Patent No.: US 12,307,345 B2
(45) Date of Patent: May 20, 2025

(54) STATE ESTIMATION DEVICE, STATE ESTIMATION PROGRAM, ESTIMATION MODEL, AND STATE ESTIMATION METHOD

(71) Applicant: NTT DOCOMO, INC., Chiyoda-ku (JP)

(72) Inventors: Noriaki Hirokawa, Chiyoda-ku (JP); Yoshitaka Inoue, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 884 days.

(21) Appl. No.: 17/599,808

(22) PCT Filed: Apr. 2, 2020

(86) PCT No.: PCT/JP2020/015253
§ 371 (c)(1),
(2) Date: Sep. 29, 2021

(87) PCT Pub. No.: WO2020/213425
PCT Pub. Date: Oct. 22, 2020

(65) Prior Publication Data
US 2022/0198341 A1    Jun. 23, 2022

(30) Foreign Application Priority Data
Apr. 19, 2019  (JP) .................. 2019-079942

(51) Int. Cl.
*G06N 3/04* (2023.01)
*G06F 18/2431* (2023.01)
(Continued)

(52) U.S. Cl.
CPC ......... *G06N 20/20* (2019.01); *G06F 18/2431* (2023.01); *G06N 3/045* (2023.01)

(58) Field of Classification Search
CPC ........................... G06N 3/045; G06F 18/2431
See application file for complete search history.

(56) References Cited

U.S. PATENT DOCUMENTS 10,809,796 B2* 10/2020 Armstrong-Muntner .................... G06N 20/00
11,232,490 B1* 1/2022 Paran ................. G06Q 30/0275
(Continued)

FOREIGN PATENT DOCUMENTS

JP    2018-10343 A    1/2018

OTHER PUBLICATIONS

Tuarob, Suppawong, et al. "How are you feeling?: A personalized methodology for predicting mental states from temporally observable physical and behavioral information." Journal of biomedical informatics 68 (2017): 1-19. (Year: 2017).*
(Continued)

*Primary Examiner* — Hal Schnee
(74) *Attorney, Agent, or Firm* — Oblon, McClelland, Maier & Neustadt, L.L.P.

(57) ABSTRACT

A state estimation device includes a sensor information acquisition unit that acquires time-series sensor data, a state allocation unit that provisionally allocates a state label to sensor data, a first model learning unit that calculates a feature parameter of sensor data to which the same state label is allocated and performs learning of a state estimation model that classifies the sensor data at each time into any one of states, a second model learning unit that performs learning of a state transition model whose input is transition of state labels before a transition reference time and whose output is a state label at a time subsequent to the transition reference time, a state allocation update unit that updates a state label allocated to each time based on the state at each
(Continued)

time estimated, and an output unit that outputs the state estimation model and the state transition model.

11 Claims, 15 Drawing Sheets

(51) Int. Cl.
  *G06N 3/045* (2023.01)
  *G06N 20/20* (2019.01)

(56) References Cited

U.S. PATENT DOCUMENTS

2020/0107072 A1*  4/2020  Lomada ................ G06N 3/084
2020/0320335 A1* 10/2020  Shamun ................ G06N 3/08
2021/0012902 A1*  1/2021  Chawla ............ G06F 18/24133

OTHER PUBLICATIONS

International Search Report issued on Jun. 16, 2020 in PCT/JP2020/015253 filed on Apr. 2, 2020, 2 pages.
English translation of the International Preliminary Report on Patentability and Written Opinion issued Oct. 28, 2021 in PCT/JP2020/015253, 5 pages.

\* cited by examiner

*Fig.7*

| TRANSITION REFERENCE TIME | INPUT FEATURE QUANTITY | SUPERVISION LABEL |
|---|---|---|
| $t_1$ | [(0,2),(1,2),(2,3),(3,3),(4,3),(5,1),(6,4)...] | 2 |
| ⋮ | ⋮ | ⋮ |

STATE ESTIMATION DEVICE, STATE ESTIMATION PROGRAM, ESTIMATION MODEL, AND STATE ESTIMATION METHOD

TECHNICAL FIELD

The present invention relates to a state estimation device, a state estimation program, an estimation model, and a state estimation method.

BACKGROUND ART

There is an increasing demand for estimating a user's specific state and predicting a user's future state. For example, a technique of estimating a user's state based on detection values acquired by different types of sensors included in a terminal owned by the user is known. Patent Literature 1, for example, discloses a technique of estimating a user's state by using a prediction model that is built by supervised learning on the association between segment information obtained by segmenting time-series sensor information detected by a sensor and a label ID corresponding to the user's state.

CITATION LIST

Patent Literature

PTL1: Japanese Unexamined Patent Publication No. 2018-10343

SUMMARY OF INVENTION

Technical Problem

The existing technique that estimates a user's state by using a model built by machine learning requires ground-truth labels to be associated with information acquired from a sensor or the like. However, it is difficult to acquire the ground-truth labels because they need to be input by a user, for example.

The present invention has been accomplished to solve the above problem and an object of the present invention is thus to estimate a user's state based on sensor information that can be acquired easily with no need for a user to input information about states.

Solution to Problem

To solve the above problem, a state estimation device according to one embodiment of the present invention is a state estimation device for estimating a user's state based on sensor data detected by a sensor, the device including a sensor information acquisition unit configured to acquire sensor information composed of time-series sensor data acquired by at least one sensor, a state allocation unit configured to provisionally allocate one of state labels for identifying each of user's states to each time and one or more types of sensor data associated with the time by a specified means, a first model learning unit configured to calculate a feature parameter indicating a feature of sensor data to which the same state label is allocated, and perform learning of a first model that classifies the sensor data associated with each time into any one of a plurality of states, a second model learning unit configured to extract, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and perform learning of a second model whose input is transition of state labels before the transition reference time and whose output is a state label at a time subsequent to the transition reference time by machine learning based on learning data including the extracted input feature quantity and the extracted supervision label, a state allocation update unit configured to estimate a state at each time based on each of the first model and the second model for each time in the time series, and update a state label allocated to each time based on each estimated state, and an output unit configured to output the first model and the second model when specified conditions for update of the state labels are satisfied.

According to the above-described embodiment, based on a state sequence, which is a sequence of state labels provisionally allocated to sensor data acquired in a times series, a first model that classifies sensor data associated with each time into any one of a plurality of states is built by unsupervised learning that calculates a feature parameter of sensor data to which the same state label is allocated, and also a second model that estimates a subsequent state based on the transition of states in a time series is built. Then, the state sequence representing the transition of states is updated based on estimation results of states output by each of the first model and the second model, and the learning of the first model and the second model is performed based on the updated state sequence, and therefore accurate estimation of states and building of a model for estimating a user's state are achieved with no need for a user to input information about states to be used for learning.

Advantageous Effects of Invention

The present invention enables the estimation of a user's state based on sensor information that can be acquired easily, with no need for a user to input information about states.

BRIEF DESCRIPTION OF DRAWINGS

FIG. 7 is a view showing an example of learning data of a state transition model.

DESCRIPTION OF EMBODIMENTS

An embodiment of a state estimation device according to the present invention is described hereinafter with reference to the drawings. Note that, where possible, the same elements are denoted by the same reference symbols and redundant description thereof is omitted.

Figure 1:
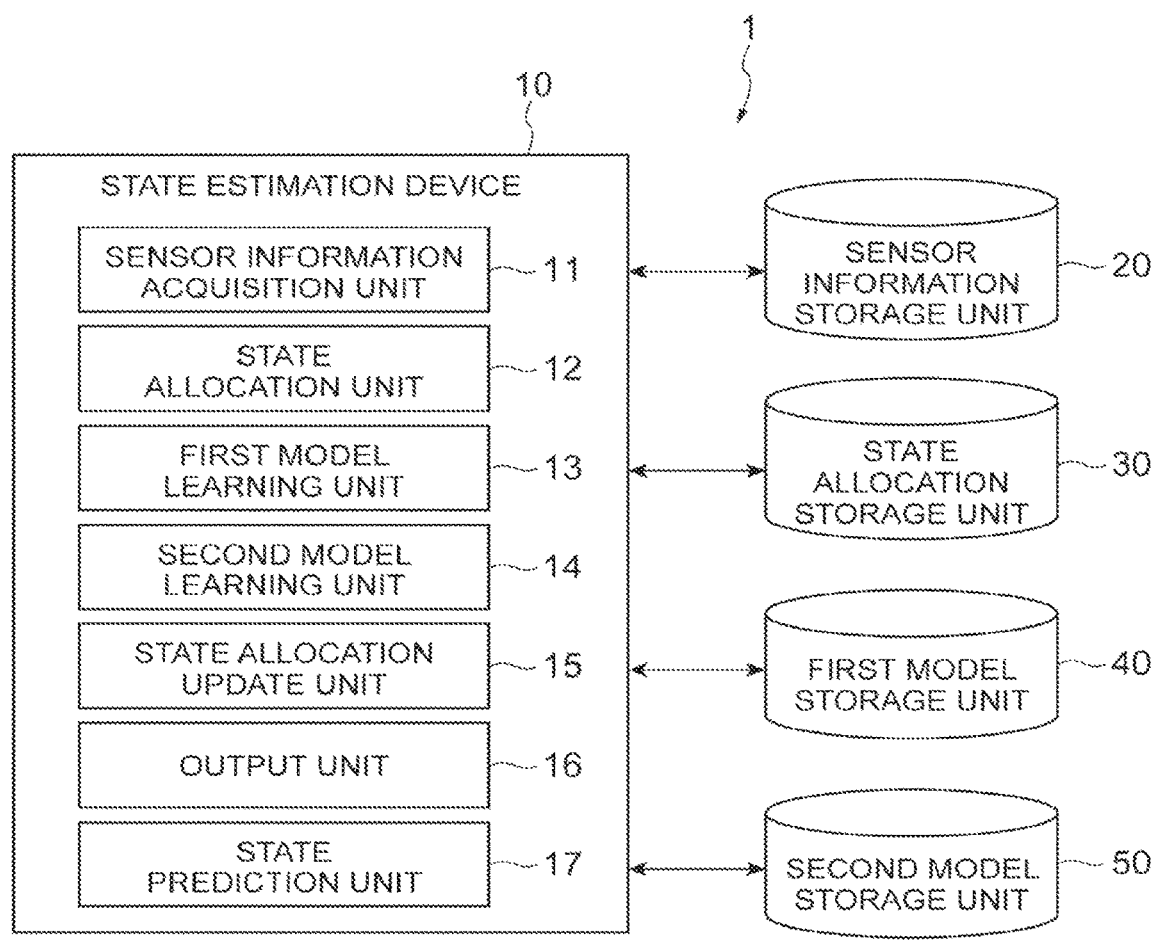
FIG. 1 is a block diagram showing the functional configuration of a state estimation system that includes a state estimation device according to an embodiment.

FIG. 1 is a view showing the functional configuration of a state estimation system that includes a state estimation device according to this embodiment. As shown in FIG. 1, a state estimation system 1 includes a state estimation device 10, a sensor information storage unit 20, a state allocation storage unit 30, a first model storage unit 40, and a second model storage unit 50. The state estimation device 10 is a device that estimates a user's state based on sensor data detected by a sensor.

The state estimation device 10 and the sensor information storage unit 20, the state allocation storage unit 30, the first model storage unit 40, and the second model storage unit 50 may be configured as one device or may be configured as separate devices.

As shown in FIG. 1, the state estimation device 10 functionally includes a sensor information acquisition unit 11, a state allocation unit 12, a first model learning unit 13, a second model learning unit 14, a state allocation update unit 15, an output unit 16, and a state prediction unit 17. The functional units 11 to 17 may be configured in one device or may be distributed among a plurality of devices. The sensor information storage unit 20, the state allocation storage unit 30, the first model storage unit 40, and the second model storage unit 50 may be configured in the state estimation device 10 or may be configured in a device different from the state estimation device 10 as long as they are accessible from the functional units 11 to 17.

The block diagram in FIG. 1 shows blocks of functional units. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 2:
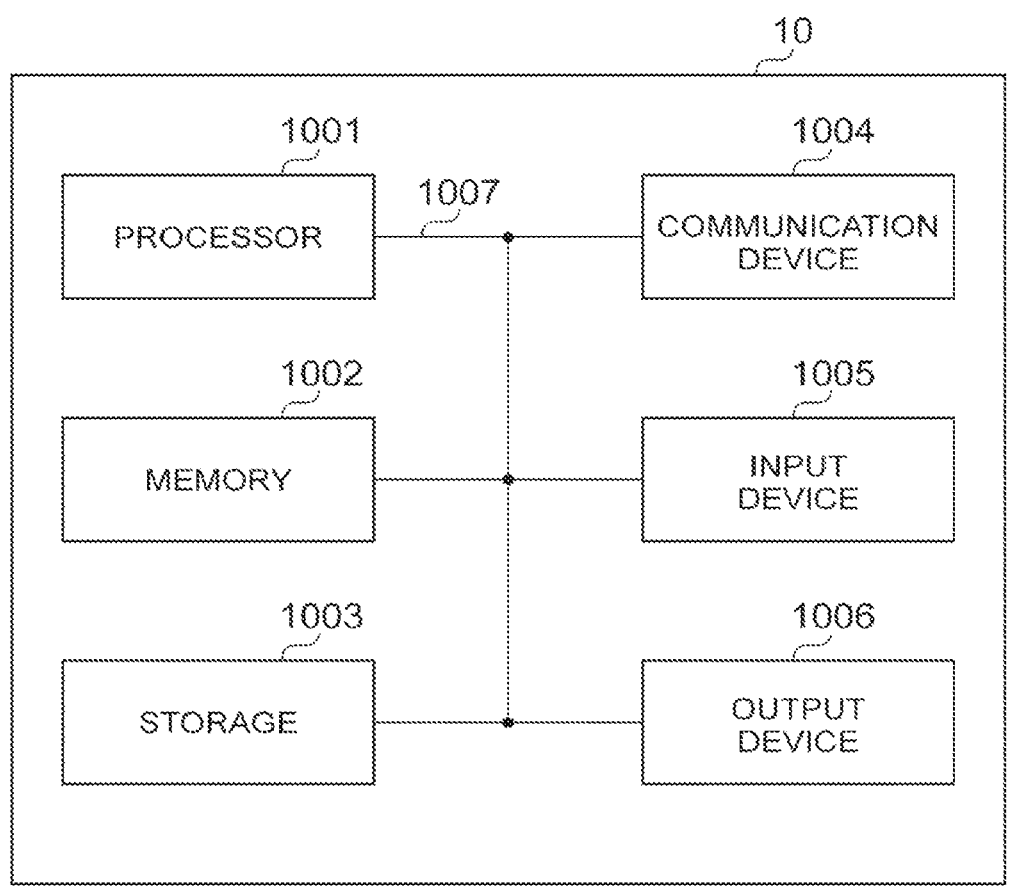
FIG. 2 is a hardware block diagram of the state estimation device.

For example, the state estimation device 10 according to one embodiment of the present invention may function as a computer. FIG. 2 is a view showing an example of the hardware configuration of the state estimation device 10 according to this embodiment. The state estimation device 10 may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the state estimation device 10 may be configured to include one or a plurality of the devices shown in the drawings or may be configured without including some of those devices.

The functions of the state estimation device 10 may be implemented by loading predetermined software (programs) on hardware such as the processor 1001 and the memory 1002, so that the processor 1001 performs computations to control communications by the communication device 1004, and reading and/or writing of data in the memory 1002 and the storage 1003.

The processor 1001 may, for example, operate an operating system to control the entire computer. The processor 1001 may be configured as a CPU (Central Processing Unit) that includes an interface with a peripheral device, a control device, an arithmetic device, a register and the like. For example, each of the functional units 11 to 17 shown in FIG. 1 and the like may be implemented by the processor 1001.

Further, the processor 1001 loads a program (program code), a software module and data from the storage 1003 and/or the communication device 1004 into the memory 1002 and performs various processing according to them. As the program, a program that causes a computer to execute at least some of the operations described in the above embodiment is used. For example, each of the functional units 11 to 17 of the state estimation device 10 may be implemented by a control program that is stored in the memory 1002 and operates on the processor 1001. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RANI (Random Access Memory) and the like, for example. The memory 1002 may be also called a register, a cache, a main memory (main storage device) or the like. The memory 1002 can store a program (program code), a software module and the like that can be executed for implementing a state estimation method according to one embodiment of the present invention.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via a wired and/or wireless network, and it may also be referred to as a network device, a network controller, a network card, a communication module, or the like.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the state estimation device 10 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

The functional units of the state estimation device 10 are described hereinafter. The sensor information acquisition unit 11 acquires sensor information composed of time-series sensor data acquired by at least one type of sensors. The sensor data is not particularly limited as long as it is related to the estimation of a user's state, and it may be data acquired by a sensor included in a terminal owned by a user, for example. The sensor may be an acceleration sensor, a tilt sensor and the like, for example. The sensor data may be information about acceleration and tilt, for example.

The sensor information storage unit 20 is a storage means that stores the sensor information. Various sensor data acquired in a user's terminal is transmitted from the terminal and stored in the sensor information storage unit 20. The state estimation device 10 may receive the sensor data transmitted from the terminal and store the received sensor data into the sensor information storage unit 20. Note that the state estimation device 10 according to this embodiment may be configured in a user's terminal.

Figure 3:
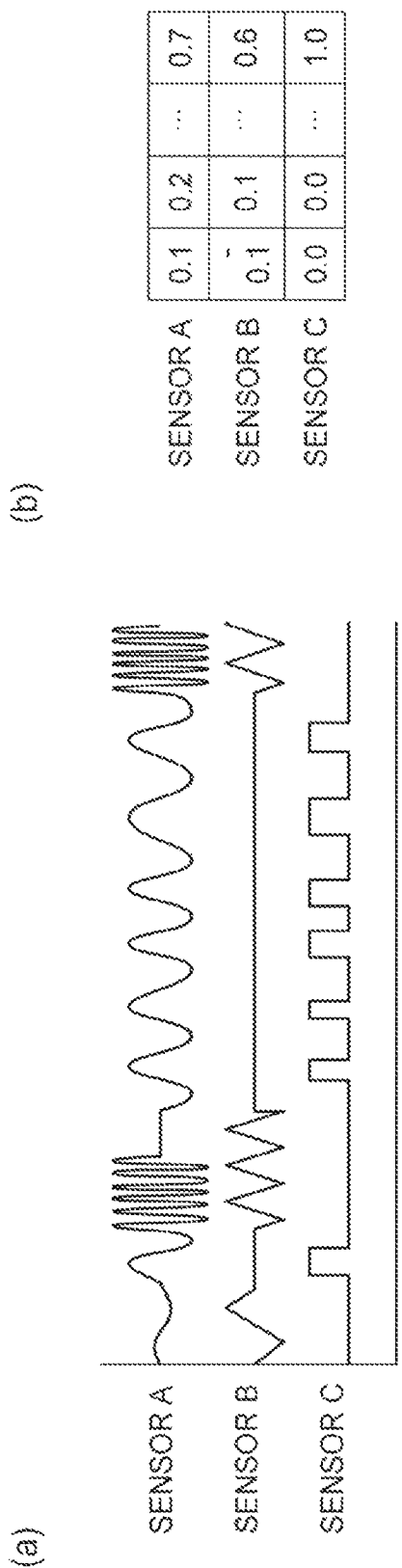
FIG. 3(*a*) is a view schematically showing sensor information, and FIG. 3(*b*) is a view schematically showing the entity of the sensor information.

FIG. 3 is a view showing an example of the sensor information. FIG. 3(*a*) is a view schematically showing the sensor information. In the example shown in FIG. 3, the sensor information includes time-series sensor data acquired by three types of sensors A to C. FIG. 3(*b*) is a view schematically showing the entity of the sensor information. Specifically, since the sensor information is composed of time-series sensor data acquired by each sensor, it can be represented as a matrix where the number of rows corresponds to the number of types of sensors as shown in FIG. 3(*b*). The number of columns of this matrix corresponds to a detected time by a sensor. Thus, the sensor information is a group of data where the sensor data of the sensor A, the sensor B and the sensor C associated with time are arranged in a time series.

The state allocation unit 12 provisionally allocates one of a plurality of state labels to each time and one or more types of sensor data associated with this time by a specified means.

The state label is a label that identifies each of user's states. The number of state labels is previously set to a specified number corresponding to the number of types of states to be distinguished. The state estimation device 10 according to this embodiment sets the number of state labels appropriately, and is thereby capable of estimating user's specific states such as commuting, doing office work, eating, outing, and coming home rather than user's states such as moving and sitting. The state labels may be numbers such as "0", "1", "2", "3", and so on, for example.

Figure 4:
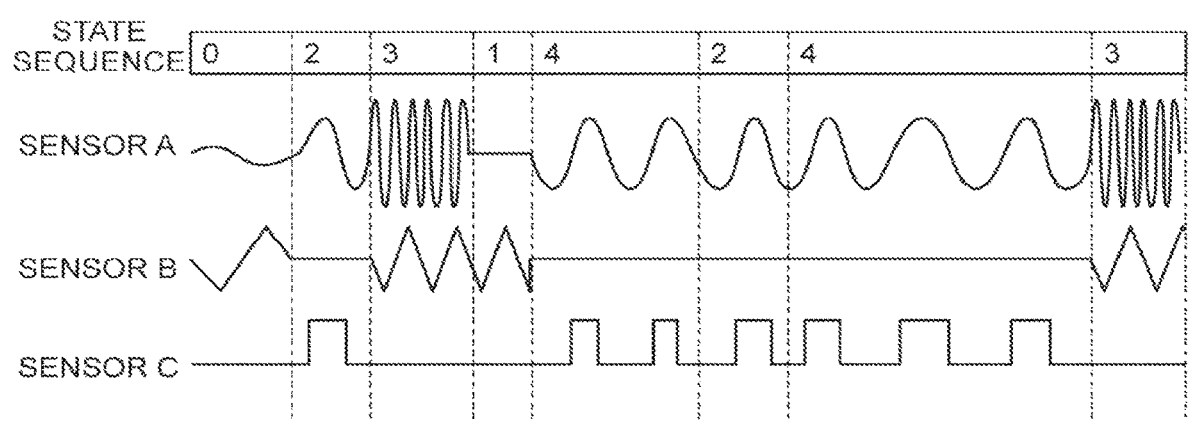
FIG. 4 is a view showing an example of the allocation of a state to sensor data at each time in the sensor information.

FIG. 4 is a view showing an example of state allocation to sensor data at each time in sensor information. In the example shown in FIG. 4, the state label "0 to 4" is allocated to each time.

The state allocation unit 12 allocates the state label to each time and one or more types of sensor data associated with this time based on random numbers as initial state allocation prior to the learning of a model, which is described later. As shown in FIG. 4, the state allocation unit 12 randomly allocates any one of the state labels "0 to 4" based on random numbers to each time in a time series and each of a set of sensor data of the sensors A to C. An initial state sequence, which is a time-series sequence of state labels allocated to each time, is thereby generated. A provisional state sequence that is suitable for the learning of a model, which is described later, is thereby obtained.

The first model learning unit 13 performs the learning of a state estimation model (first model) that classifies the sensor data associated with each time into any one of a plurality of states. To be specific, the first model learning unit 13 extracts the sensor data to which the same state label is allocated. Then, the first model learning unit 13 performs the learning of the state estimation model by unsupervised learning that calculates a feature parameter representing the feature of the extracted sensor data for each state label.

The unsupervised learning in this example may be cluster analysis such as k-means, analysis using a variance-covariance matrix (Markov random field model) or the like, and a means of learning is not limited.

The feature parameter that defines the state estimation model may include at least one of the average and the variance-covariance matrix of one or more types of sensor data. In this embodiment, the average and the variance-covariance matrix of one or more types of sensor data are the feature parameter of the state estimation model.

Figure 5:
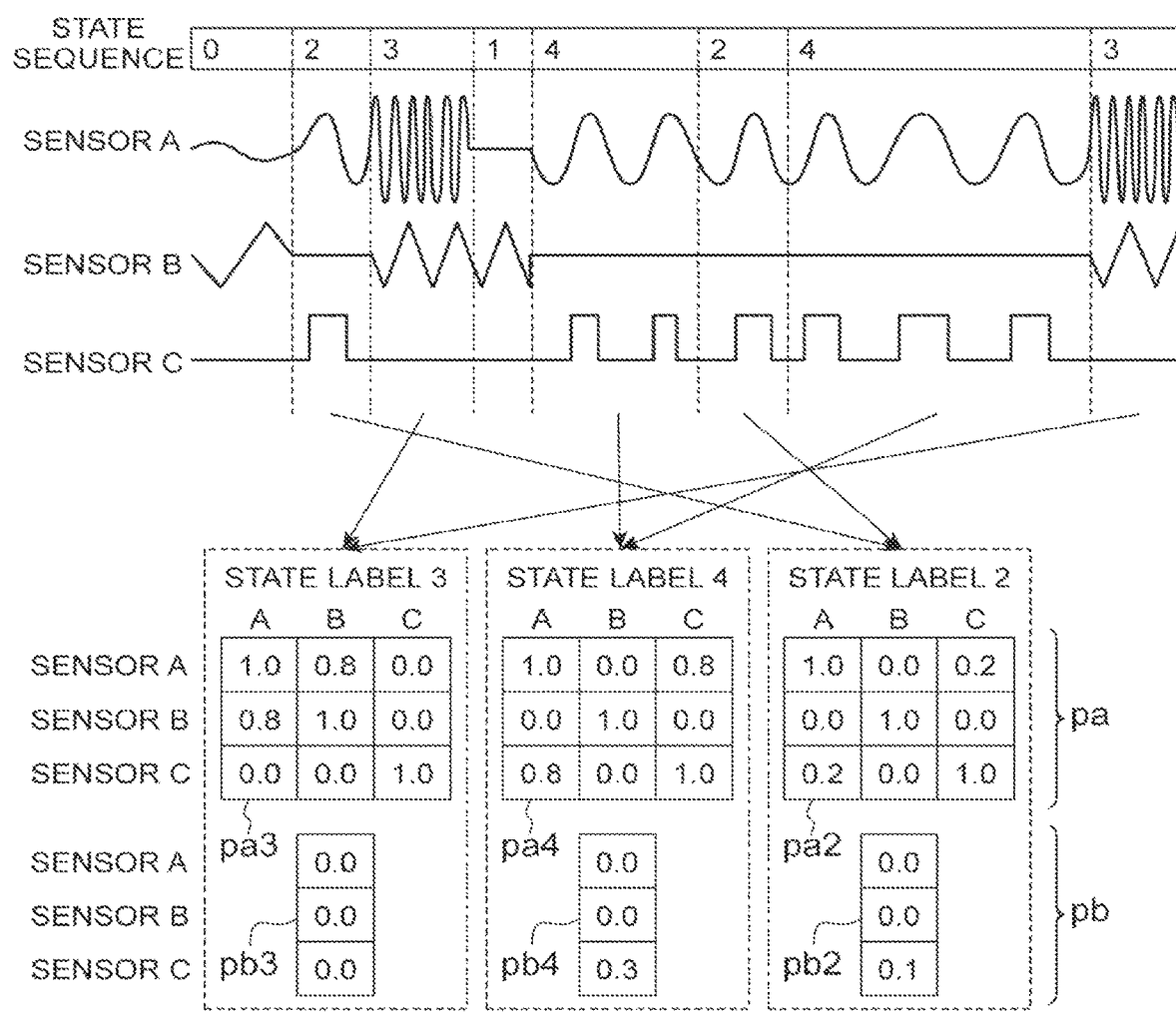
FIG. 5 is a view illustrating learning of a state estimation model.

FIG. 5 is a view illustrating the learning of the state estimation model. As shown in FIG. 5, the first model learning unit 13 extracts the sensor data to which the same state label is allocated based on the state sequence generated by the state allocation unit 12 or the state sequence updated by the state allocation update unit 15. Then, the first model learning unit 13 calculates a variance-covariance matrix pa3 and an average pb3 based on the sensor data of the sensors A to C to which the state label 3 is allocated, for example, and outputs a feature parameter par3 of the state label "3".

Likewise, the first model learning unit 13 calculates a variance-covariance matrix pa4 and an average pb4 based on the sensor data of the sensors A to C to which the state label 4 is allocated, and outputs a feature parameter par4 of the state label "4". Further, the first model learning unit 13 calculates a variance-covariance matrix pa2 and an average pb2 based on the sensor data of the sensors A to C to which the state label 2 is allocated, and outputs a feature parameter par2 of the state label "2".

The first model learning unit 13 stores the feature parameter of each state label as a learned state estimation model into the first model storage unit 40. The first model storage unit 40 is a storage means that stores the state estimation model that is being learned and the state estimation model that has been already learned.

Figure 6:
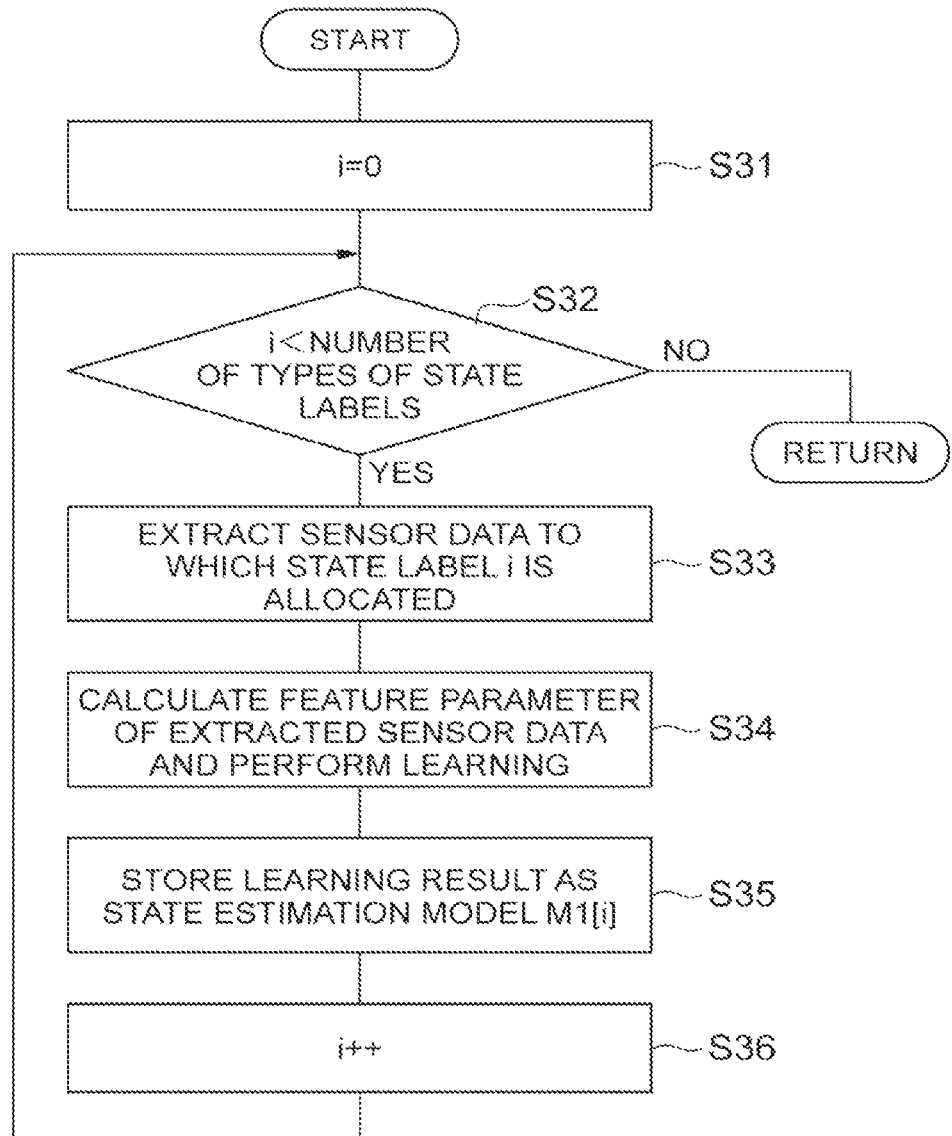
FIG. 6 is a flowchart showing a learning process of the state estimation model.

FIG. 6 is a flowchart showing a learning process of the state estimation model. The flowchart shown in FIG. 6 corresponds to the processing of Step S3 in the flowchart of FIG. 14, which is described later.

In Step S31, the first model learning unit 13 initializes a variable i for counting the number of types of state labels. In Step S32, the first model learning unit 13 determines whether the variable i is less than the number of types of state labels or not. When it is determined that the variable i is less than the number of types of state labels, the process proceeds to Step S33. On the other hand, when it is not determined that the variable i is less than the number of types of state labels, the learning process ends.

In Step S33, the first model learning unit 13 extracts the sensor data to which the state label [i] is allocated based on a state sequence, which is a time-series sequence of state labels allocated to each time.

In Step S34, the first model learning unit 13 calculates the feature parameter (for example, the variance-covariance matrix and the average of the sensor data acquired by a plurality of sensors) of the sensor data extracted in Step S33.

In Step S35, the first model learning unit 13 stores the feature parameter, which is a learning result, as a state estimation model M1[i] related to the state label [i] into the first model storage unit 40. In Step S36, the first model learning unit 13 increments the value of the variable i, and the process returns to Step S32.

The second model learning unit 14 performs the learning of a state transition model (second model). The state transition model is a model whose input is the transition of state labels before a transition reference time, which is one time point in a time series, extracted from a state sequence being a time-series sequence of state labels, and whose output is a state at a time subsequent to the transition reference time. The state transition model may be a model configured to include a neural network.

The second model learning unit 14 stores a parameter that defines the state transition model as a learned state transition model into the second model storage unit 50. The second model storage unit 50 is a storage means that stores the state transition model that is being learned and the state transition model that has been already learned.

To be specific, the second model learning unit 14 extracts, from the state sequence, information indicating the transition of state labels before the transition reference time and a state label allocated to a time subsequent to the transition reference time as an input feature quantity and a supervision label, respectively, and generates learning data composed of the extracted input feature quantity and supervision label. The second model learning unit 14 generates a plurality of learning data by setting each time along a time series as the transition reference time, and performs the learning of the state transition model by machine learning based on the generated learning data.

The state transition model, which is a model including a learned neural network, can be regarded as a program that is read or referred to by a computer, and causes the computer to perform specified processing and causes the computer to implement specified functions.

Specifically, the learned state transition model according to this embodiment is used in a computer including a CPU and a memory. To be specific, the CPU of the computer operates to perform computation based on a learned weighting coefficient, response function or the like corresponding to each layer on input data (for example, an input feature quantity, which is information indicating the transition of state labels before the transition reference time) input to an input layer of the neural network according to an instruction from the learned state transition model stored in the memory, and output a result (the likelihood of each state label) from an output layer.

The neural network included in the state transition model may be a feedforward neural network, a convolutional neural network or the like, for example, and the type of a neural network to be used is not limited.

FIG. 7 is a view showing an example of learning data of the state estimation model. As shown in FIG. 7, learning data for the learning of the state estimation model includes an input feature quantity and a supervision label associated with a transition reference time t1, which is one time point in a time series corresponding to a state sequence. The input feature quantity may be a sequence of state labels associated with relative times with respect to the transition reference time, for example. The supervision label is a state label that is allocated to a time subsequent to the transition reference time in the state sequence.

The second model learning unit may generate information indicating the transition of state labels, which is the input feature quantity in the learning data, by compressing a time-series sequence of state labels before the transition reference time by a specified means. To be specific, the second model learning unit 14 may extract, as the input feature quantity, only pairs where the transition of state labels occurs (compress a consecutive sequence of identical state labels) from a sequence of pairs of time-series relative times before the transition reference time and state labels. For example, the second model learning unit 14 may extract a compressed sequence [(0,A),(3,B)(6,C)] as the input feature quantity from a sequence of pairs of relative times and state labels [(0,A),(1,A),(2,A),(3,B),(4,B),(5,B),(6,C) . . . ].

Figure 8:
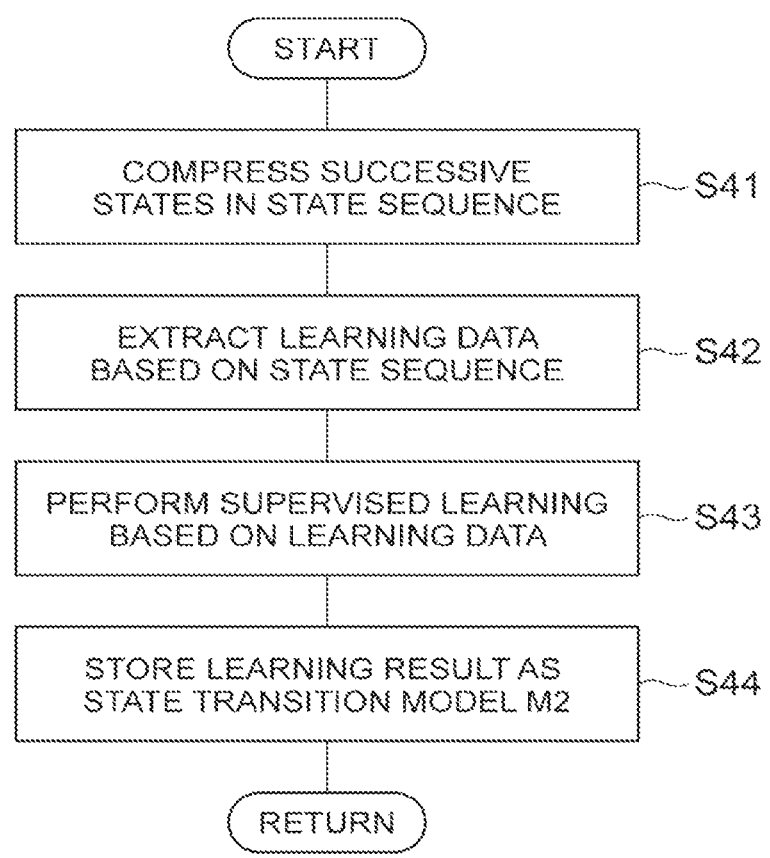
FIG. 8 is a flowchart showing a learning process of the state transition model.

FIG. 8 is a flowchart showing a learning process of the state transition model. The flowchart shown in FIG. 8 corresponds to the processing of Step S4 in the flowchart of FIG. 12, which is described later.

In Step S41, the second model learning unit 14 compresses a consecutive sequence of identical state labels in the state sequence generated by the state allocation unit 12 or the state sequence updated by the state allocation update unit 15. Note that the compression of a sequence of state labels in Step S41 is not essential processing.

In Step S42, the second model learning unit 14 extracts learning data based on the state sequence.

In Step S43, the second model learning unit 14 performs the learning of the state transition model by supervised learning by using the learning data extracted in Step S42. To be specific, the second model learning unit 14 inputs the above-described input feature quantity to the currently learned state transition model, calculates a loss based on an output value from the state transition model including a neural network and a supervision label, and updates the parameter (weight) of the neural network through the back propagation of the calculated loss in the neural network. A known learning technique for a model including a neural network can be applied to the learning of the state transition model in this embodiment.

In Step S44, the second model learning unit 14 stores the parameter, which is a learning result, as a state transition model M2 into the second model storage unit 50.

The state allocation update unit 15 estimates a state at each time based on each of the state estimation model and the state transition model for each time in a time series, and updates the state label allocated to each time based on the estimated states.

To be specific, the state allocation update unit 15 calculates the likelihood of each state at each time in a time series based on each of the state estimation model and the state transition model, and updates the state label allocated to each time based on the calculated likelihoods of each state at each time.

Figure 9:
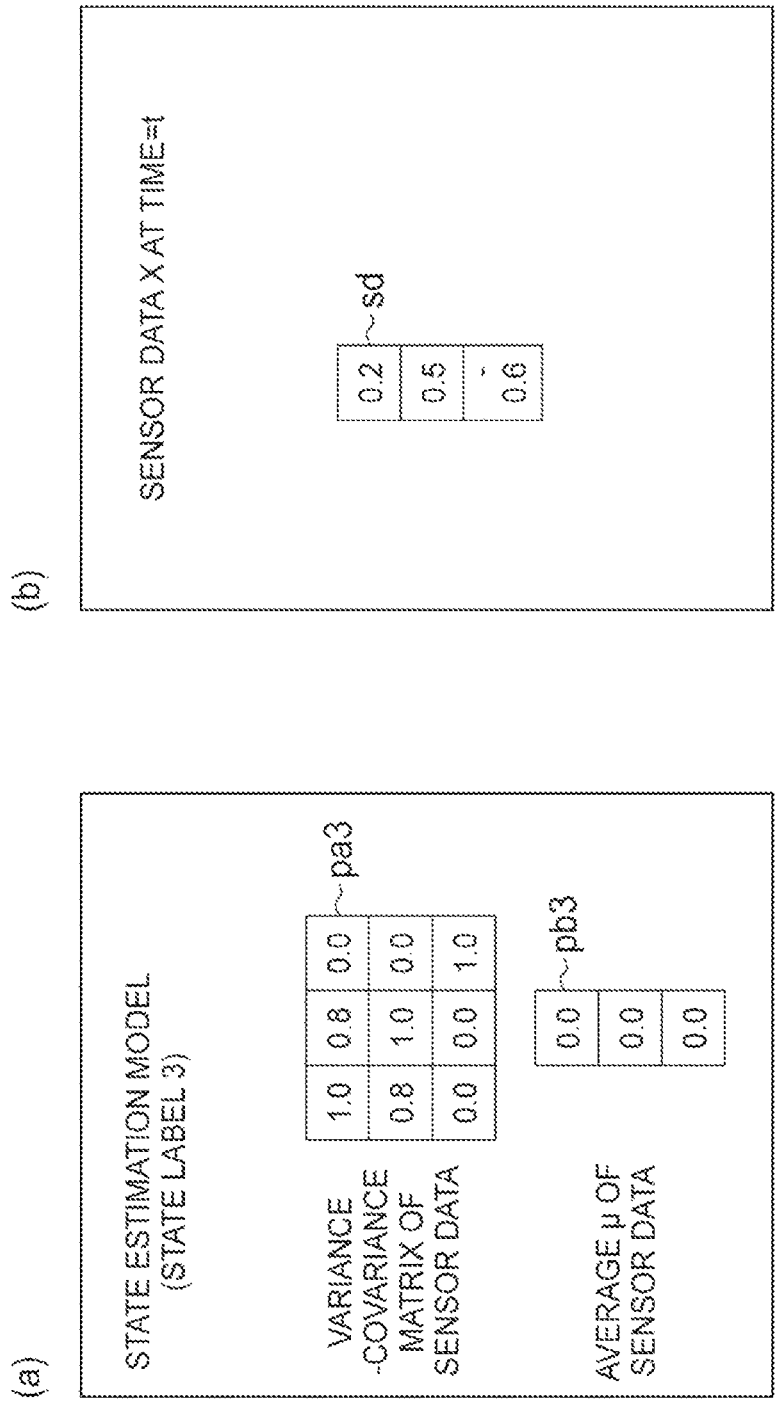
FIG. 9(*a*) is a view showing an example of parameters of the state estimation model, and FIG. 9(*b*) is a view showing an example of sensor data for which a state is to be estimated.

An example of the calculation of the likelihood of each state at each time in a time series based on the state estimation model by the state allocation update unit 15 is described with reference to FIG. 9. The state allocation update unit 15 calculates the likelihood by the following equation (1):

$$ll_1(X_{ut},\Theta_{k_{ut}}) = -\tfrac{1}{2}(X_{ut}-\mu_{ut})^T \Theta_{k_{ut}}(X-\mu_{ut}) + \tfrac{1}{2}\log \det \Theta_{k_{ut}} - n/2 \log(2\pi)$$

FIG. 9(a) is a view showing an example of the feature parameter of the state estimation model. To be specific, the feature parameters shown in FIG. 9(a) constitute the state estimation model for calculating the likelihood that the sensor data associated with time belongs to the state label "3". FIG. 9(b) is a view showing an example of the sensor data to be used for the estimation of a state.

To calculate the likelihood that the sensor data sd belongs to the state label "3", the state allocation update unit 15 applies an inverse matrix of the variance-covariance matrix pa3, the average pb3, and the sensor data sd to $\Theta_{k_{ut}}$, $\mu_{ut}$, and $X_{ut}$, respectively, in the equation (1) and thereby calculates a likelihood ll.

Figure 10:
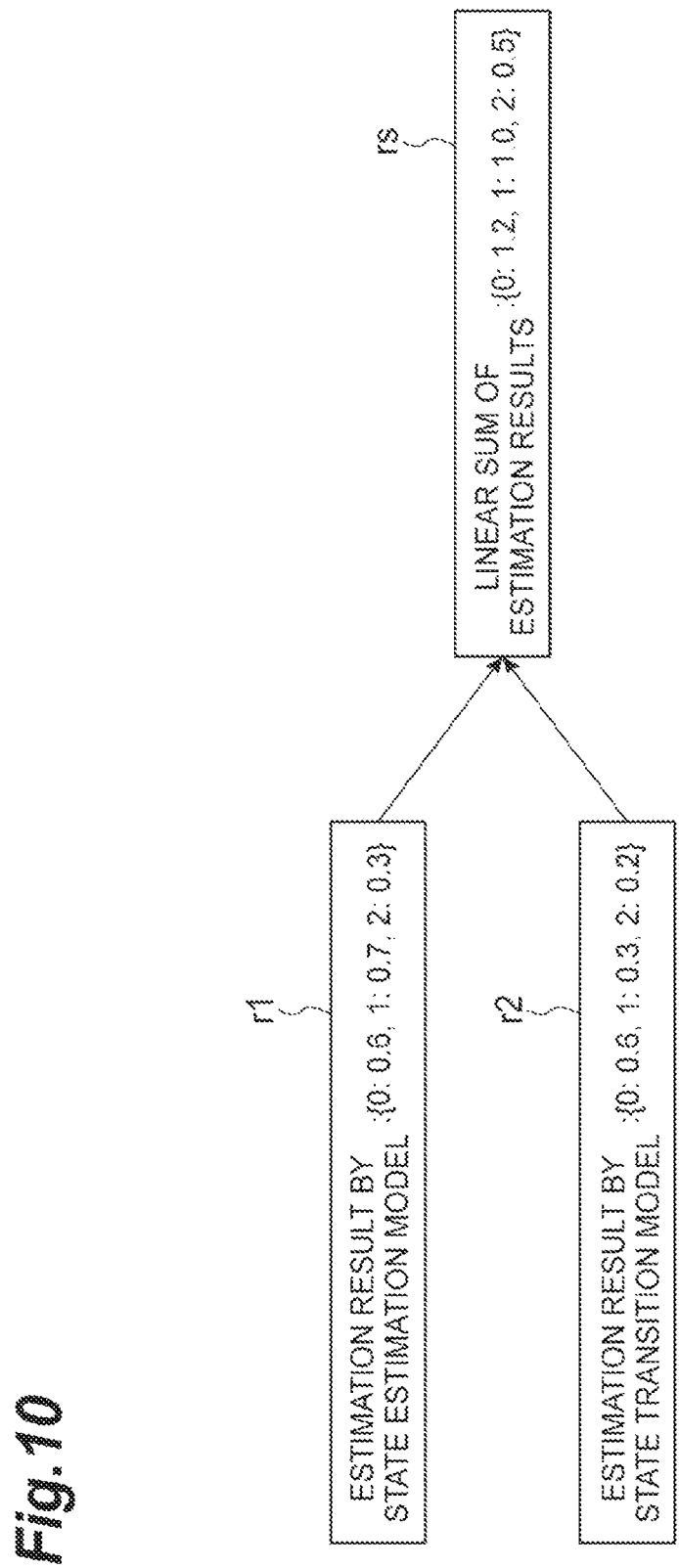
FIG. 10 is a view illustrating an example of update of state allocation.

FIG. 10 is a view illustrating an example of the update of state allocation. An estimation result r1 is the likelihood of belonging to each of the state labels 0, 1 and 2, which is calculated by the state estimation model updated by learning based on a certain time t in a time series and the sensor data associated with time t. The estimation result r1 is calculated by using the equation (1), for example. An estimation result r2 is the likelihood of belonging to each of the state labels 0, 1 and 2, which is calculated by the state transition model updated by learning based on the input feature quantity extracted from the state sequence where time t is the transition reference time.

The state allocation update unit 15 calculates the linear sum of likelihoods, for example, based on the estimation result r1 and the estimation result r2. Then, the state allocation update unit 15 updates the state label allocated time t to the state label "0" whose value of the calculated linear sum of likelihoods is greatest (whose value of the linear sum of negative log-likelihoods is smallest).

In this manner, since the likelihood of each state at each time is calculated by each of the state estimation model and the state transition model, and the likelihoods calculated by the both models are taken into consideration, the allocation of states in the state sequence is updated appropriately. For example, in the example shown in FIG. 10, if the state allocation is updated by using the state estimation model only, the state label at time t is updated to "1" because the likelihood of the state label "1" is greatest. In this embodiment, on the other hand, the state label at time t is appropriately updated to "0" because the likelihoods calculated by both of the state estimation model and the state transition model are taken into consideration.

Figure 11:
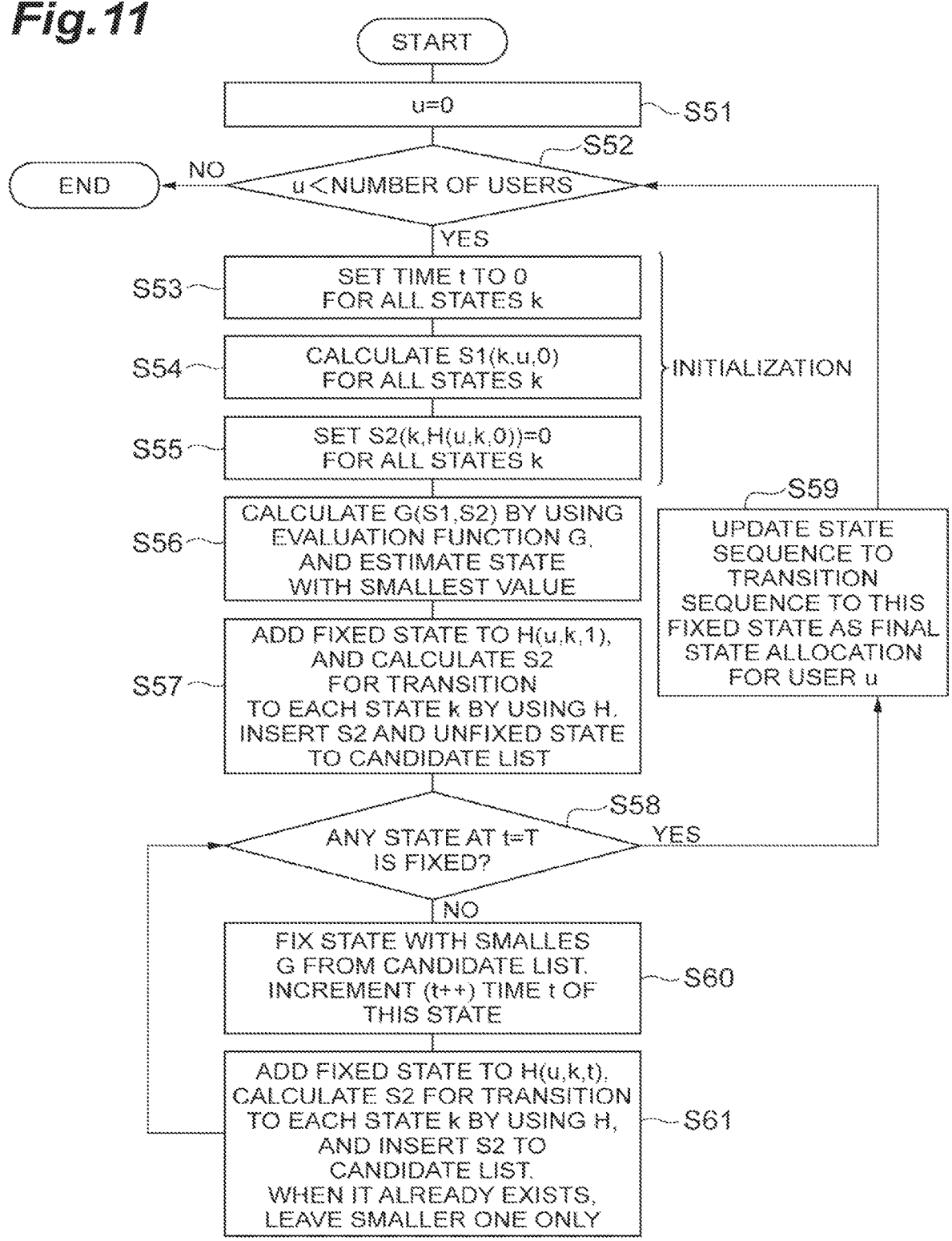
FIG. 11 is a flowchart showing an example of an update process of state allocation.

FIG. 11 is a flowchart showing an example of an update process of state allocation of all users. In Step S51, the state allocation update unit 15 initializes a variable u for counting the number of users to 0. In Step S52, the state allocation update unit 15 determines whether the variable u is less than the number of users. When it is not determined that the variable u is less than the number of users, the update process of state allocation ends. On the other hand, when it is determined that the variable u is less than the number of users, the process proceeds to Step S53.

In Step S53, the state allocation update unit 15 initializes a variable t for counting time to 0 for all of state labels k. In Step S54, the state allocation update unit 15 calculates a score S1(k,u,0) for all of the state labels k. The score S1(k,u,t) is a score generated by a state estimation model M1 [k] related to the state labels k for sensor data v(u,t) at time t of the user u. As the value of the score S1 is smaller, the sensor data v is likely to occur in the state indicated by the state label k. In Step S55, the state allocation update unit 15 sets a score S2(k,H(u,k,0)) to 0 for all state labels k. The score S2 is a score generated for the state labels k based on H(u,k,t), which is a set of pairs of time t'(<t) and a state label, and the state transition model M2. As the value of the score S2 is smaller, it is likely to transition to the state k.

In Step S56, the state allocation update unit 15 calculates G(S1,S2) by using an evaluation function G, and thereby fixes the state label where its value is smallest. Fixing means determining the transition of states up to this state. The evaluation function G is an index indicating the probability of occurrence of the state k, and the state k is likely to occur as its value is smaller. G(S1,S2) may be the linear sum of S1 and S2, for example.

In Step S57, the state allocation update unit 15 adds the state label fixed in Step S55 to a set (sequence) of pairs of time and a state label and thereby acquires H(u,k,1). Then, the state allocation update unit 15 calculates a score S2 related to each state label k by using the acquired H, and stores each state label k and its score S2 as an unfixed state in a candidate list.

In Step S58, it is determined whether any state at t=T is fixed or not, and the processing of Steps S58 and S60 to S61 is repeated until it is determined that a state is fixed. When it is determined that a state is fixed, the process proceeds to Step S59.

In Step S60, the state allocation update unit 15 refers to the candidate list stored in Step S57 and Step S61 and calculates a state evaluation function G(S1,S2) by using the score S2 related to each state label, so that the state label with the smallest value of G is fixed.

In Step S61, the state allocation update unit 15 adds the state label fixed in Step S60 to H(u,k,t), calculates the score S2 related to each state label k by using H(u,k,t), and stores each state label k and its score S2 in the candidate list. When the candidate list includes an already stored unfixed state, the state with a smaller score is stored. Further, the state allocation update unit 15 increments the value of the variable t related to the fixed state.

In Step S59, the state allocation update unit 15 updates a state sequence to a transition sequence composed of fixed states as the final state allocation for the user u.

Referring back to FIG. 1, the output unit 16 outputs the state estimation model and the state transition model when specified conditions for the update of state labels are satisfied. The specified conditions for the update of state labels may be when each model and a state sequence converge with no change in state allocation in the state sequence in the processing of learning each model and updating the state sequence, for example.

When specified conditions are satisfied, the output unit 16 stores the state estimation model and the state transition model into the first model storage unit 40 and the second model storage unit 50, respectively, for example.

Further, when specified conditions for the update of state labels are satisfied, the output unit 16 may output the state sequence where the state label at each time is updated. The output unit 16 stores it into the state allocation storage unit 30, for example. The state allocation storage unit 30 is a storage means that stores state sequences. By outputting the state sequence in this manner, an accurate state sequence estimated by the state estimation model and the state transition model is obtained.

The state prediction unit 17 inputs the sensor information to the learned state estimation model and state transition model and acquires a state sequence, which is a sequence of state labels representing the transition of states up to the present time. The output unit 16 outputs the state sequence acquired by the state prediction unit 17. The output unit 16 may transmit or provide the state sequence acquired by the state prediction unit 17 as a state estimation result to a user's terminal.

As described above, by inputting the sensor information composed of time-series sensor data to the state estimation model and the state transition model, the state sequence representing the transition of states up to the present time is output, which achieves obtaining an accurately estimated user's state.

Further, the state prediction unit 17 may input a state sequence, which is a sequence of state labels up to the present time to the state transition model and acquire a state label at a time subsequent to the present time. The output unit 16 outputs a state label at a time subsequent to the present time. The output unit 16 may transmit or provide the state label at a time subsequent to the present time as a prediction result of a user's future state to the user's terminal.

As described above, by inputting the state sequence up to the present time to the state transition model, the state label at a time subsequent to the present time is output, and thereby accurate prediction of a user's state after the present time is achieved.

Further, the state prediction unit 17 can acquire a plurality of state sequences by inputting the sensor information of each of a plurality of users to the learned state estimation model and state transition model. The state prediction unit 17 performs specified data mining on the plurality of acquired state sequences and acquires a predetermined number of patterns of state sequences whose frequency of occurrence is high. The state prediction unit 17 may perform any of known data mining processing. The state prediction unit 17 may perform data mining such as frequent pattern extraction that founds a characteristic pattern occurring frequently, class classification, regression analysis, and clustering. Further, the number of patterns of state sequences to be acquired may be any number.

The output unit 16 may output a predetermined number of patterns of state sequences whose frequency of occurrence is high, which are acquired by the state prediction unit 17. The sensor information acquired by the sensor information acquisition unit 11 can be vast amounts of multidimensional data because they are time-series sensor data acquired by a plurality of sensors. If data mining is performed on such multidimensional and vast amounts of data, even when certain sensor data has only a slight difference between users, they are classified as different patterns, which can cause a classification result that is difficult to be interpreted to be obtained. In this embodiment, since the sensor information is input to the state estimation model and the state transition model, they are compressed to information in a sequence with one variable, such as a sequence of state labels. By performing data mining on a state sequence where the sensor information is compressed in this manner, provision of significant and easily interpretable information is achieved.

Figure 12:
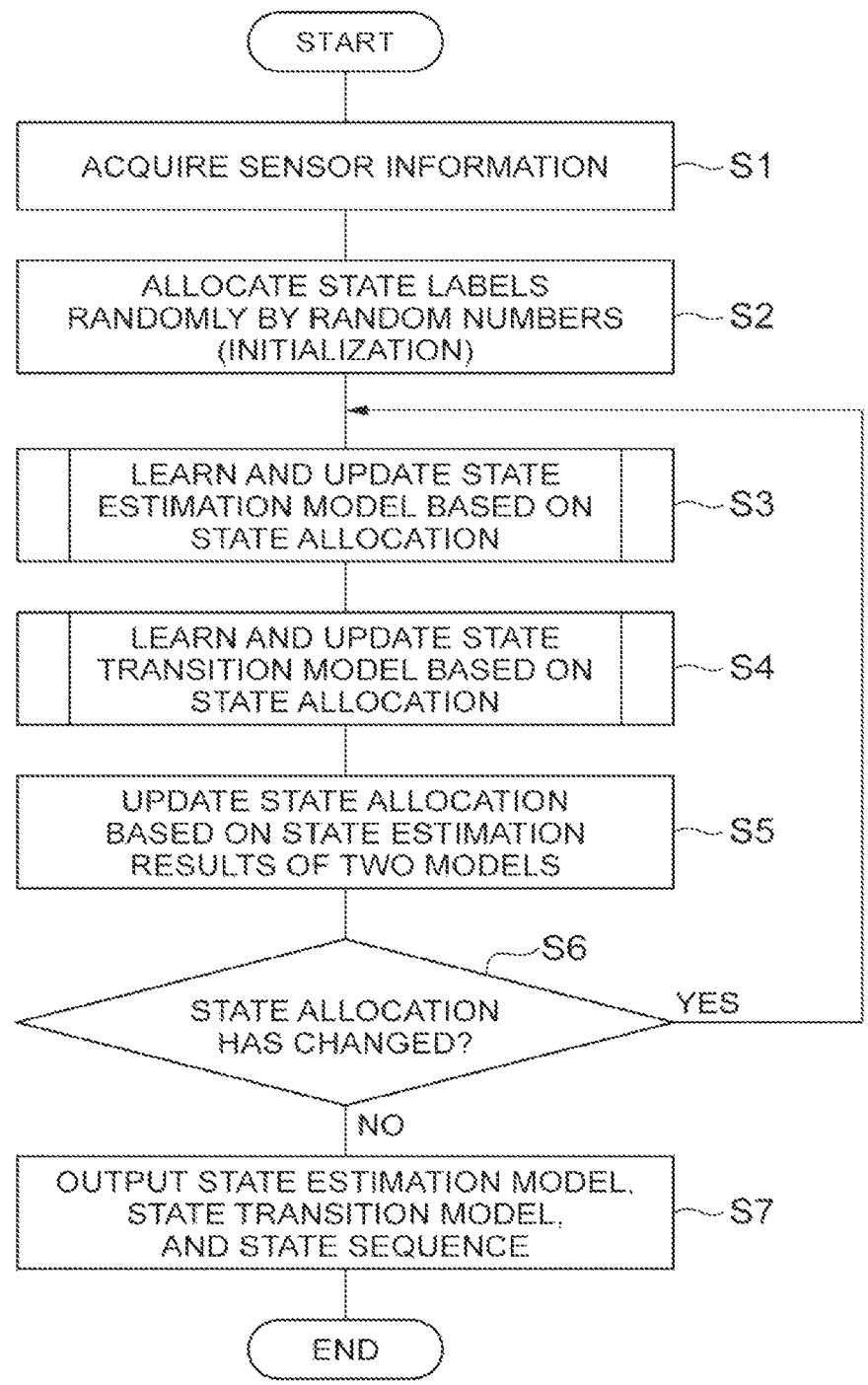
FIG. 12 is a flowchart showing a process of a state estimation method of a model generation phase in the state estimation device.

FIG. 12 is a flowchart showing a process of a state estimation method of a model generation phase in the state estimation device 10.

In Step S1, the sensor information acquisition unit 11 acquires the sensor information. In Step S2, the state allocation unit 12 randomly allocates one of a plurality of state labels to each time and sensor data associated with this time based on random numbers.

In Step S3, the first model learning unit 13 performs the learning and update of the state estimation model based on the state allocation in Step S2 or the state allocation (update) in Step S5. The processing in Step S3 corresponds to the process of the flowchart shown in FIG. 6, for example.

In Step S4, the second model learning unit 14 performs the learning and update of the state transition model based on the state allocation in Step S2 or the state allocation (update) in Step S5. The processing in Step S4 corresponds to the flowchart of the flowchart shown in FIG. 8, for example.

In Step S5, the state allocation update unit 15 updates the state allocation in the state sequence based on estimation results of state labels (for example, the likelihood of belonging to each state label) for the sensor data at each time by the learned and updated state estimation model and state transition model.

In Step S6, the state allocation update unit 15 determines whether the state allocation in the state sequence has changed. When it is determined that the state allocation has changed, the process returns to Step S3. On the other hand, when it is not determined that the state allocation has changed, the process proceeds to Step S7.

In Step S7, the output unit 16 outputs the state estimation model, the state transition model, and the state sequence.

Figure 13:
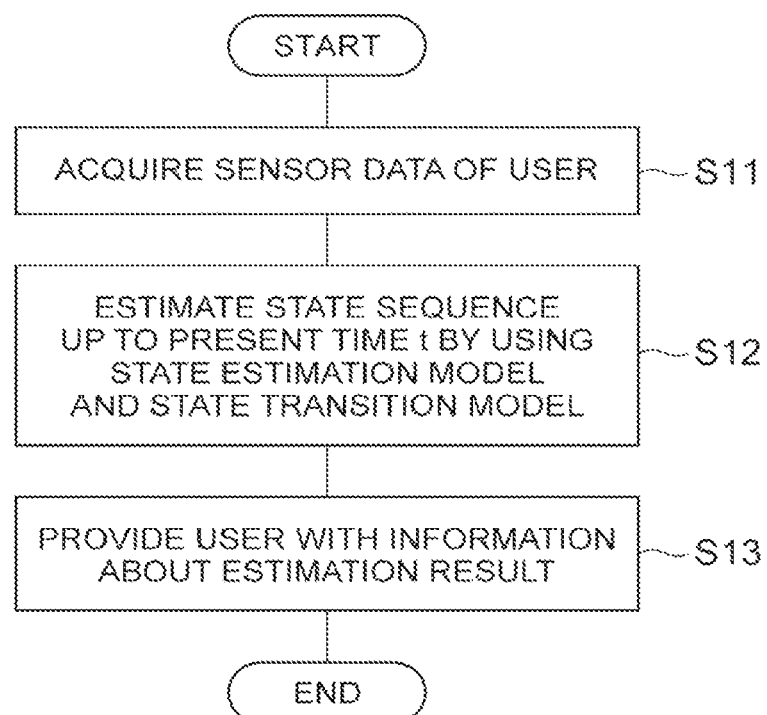
FIG. 13 is a flowchart showing a process of a state estimation method that estimates the transition of states up to the present time.

FIG. 13 is a flowchart showing a process of a state estimation method that estimates the transition of states up to the present time.

In Step S11, the sensor information acquisition unit 11 acquires the sensor information composed of time-series sensor data acquired in a user's terminal, for example.

In Step S12, the state prediction unit 17 inputs the sensor information to the learned state estimation model and state transition model, and estimates a state sequence, which is a sequence of state labels representing the transition of states up to the present time t.

In Step S13, the output unit 16 transmits and provides the state sequence estimated in Step S12 as an estimation result of a user's state to the user's terminal, for example.

Figure 14:
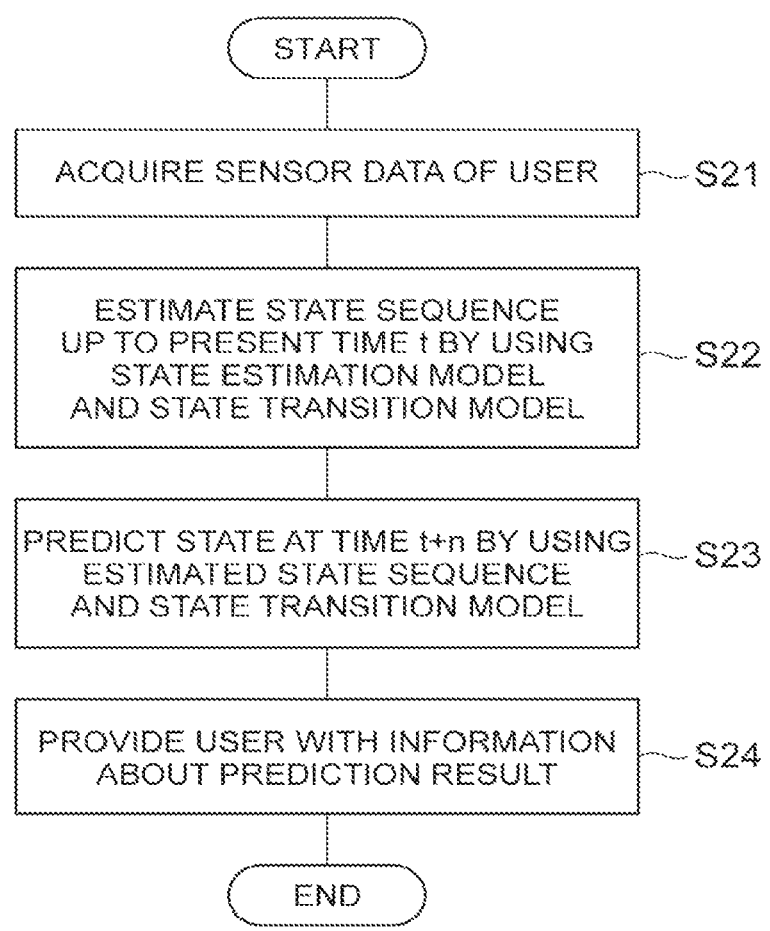
FIG. 14 is a flowchart showing a process of a state estimation method that estimates a state at a time subsequent to the present time.

FIG. 14 is a flowchart showing a process of a state estimation method that estimates a state at a time subsequent to the present time.

In Step S21, the sensor information acquisition unit 11 acquires the sensor information composed of time-series sensor data acquired in a user's terminal, for example.

In Step S22, the state prediction unit 17 inputs the sensor information to the learned state estimation model and state transition model, and estimates a state sequence, which is a sequence of state labels representing the transition of states up to the present time t.

In Step S23, the state prediction unit 17 predicts a state at time t+n by using the state sequence estimated in Step S22 and the state transition model.

In Step S24, the output unit 16 transmits and provides the state label predicted in Step S23 as a prediction result of a user's future state to the user's terminal, for example.

Figure 15:
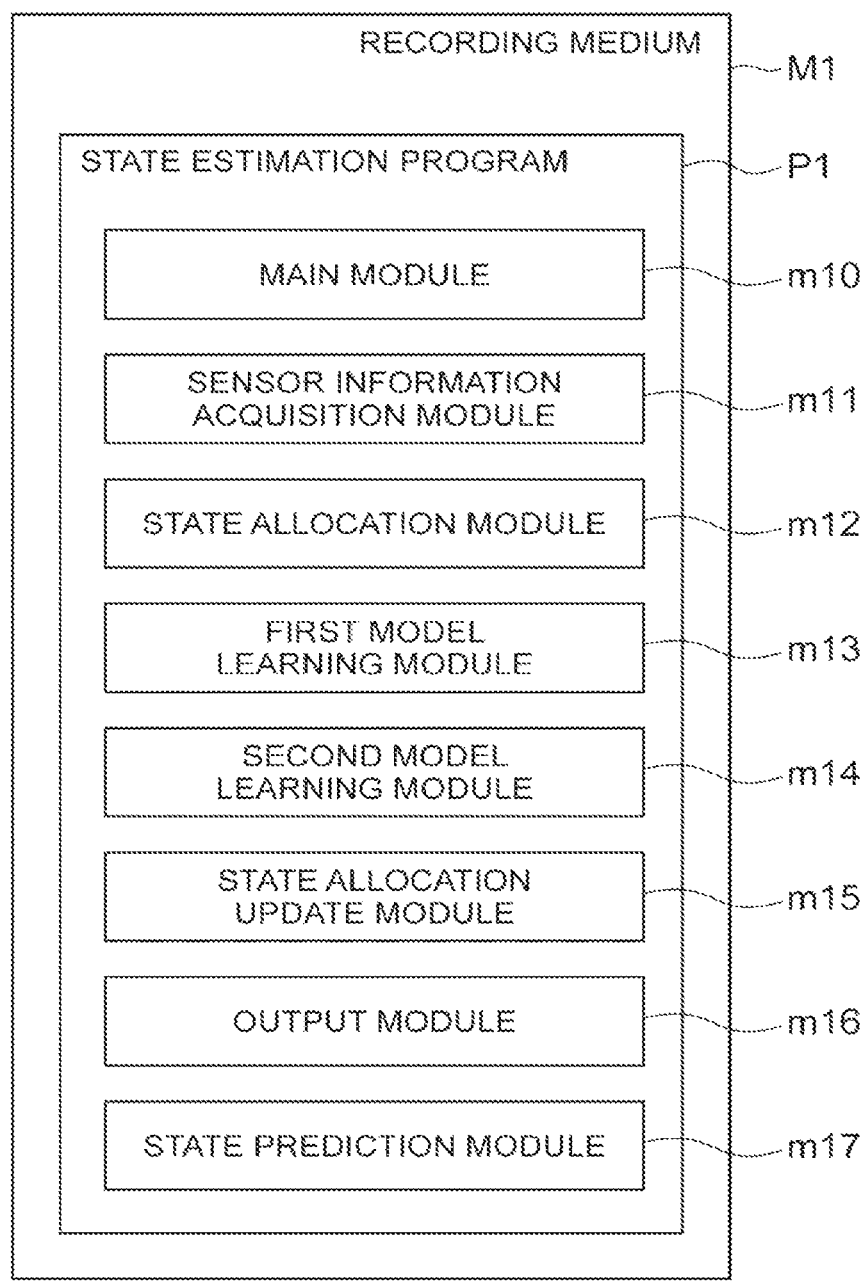
FIG. 15 is a view showing the configuration of a state estimation program.

A state estimation program that causes a computer to function as the state estimation device 10 according to this embodiment is described hereinafter. FIG. 15 is a view showing the configuration of the state estimation program.

A state estimation program P1 includes a main module m10 that exercises control over the state estimation processing in the state estimation device 10, a sensor information acquisition module m11, a state allocation module m12, a first model learning module m13, a second model learning module m14, a state allocation update module m15, an output module m16, and a state prediction module m17. The functions for the sensor information acquisition unit 11, the state allocation unit 12, the first model learning unit 13, the second model learning unit 14, the state allocation update unit 15, the output unit 16, and the state prediction unit 17 are implemented by the modules m11 to m17, respectively. Note that the state estimation program P1 may be transmitted through a transmission medium such as a communication line or may be stored in a recording medium M1 as shown in FIG. 15.

In the state estimation device 10, the state estimation method, and the state estimation program P1 according to the embodiment described above, based on a state sequence, which is a sequence of state labels provisionally allocated to sensor data acquired in a times series, a state estimation model that classifies sensor data associated with each time into any one of a plurality of states is built by unsupervised learning that calculates a feature parameter of sensor data to which the same state label is allocated, and also a state transition model that estimates a subsequent state based on the transition of states in a time series is built. Then, the state sequence representing the transition of states is updated based on estimation results of states output by each of the state estimation model and the state transition model, and the learning of the state estimation model and the state transition model is performed based on the updated state sequence, and therefore accurate estimation of states and building of a model for estimating a user's state are achieved with no need for a user to input information about states to be used for learning.

In the state estimation device according to another embodiment, the feature parameter may include at least one of an average and a variance-covariance matrix of the one or more types of sensor data.

According to the above embodiment, a feature of the sensor data to which the same state label is allocated is appropriately represented by the feature parameter, and therefore the first model capable of accurate state allocation is constructed.

In the state estimation device according to another embodiment, the state allocation update unit may calculate a likelihood of each state at each time in the time series based on each of the first model and the second model, and update the state label allocated to each time based on the calculated likelihood of each state at each time.

According to the above embodiment, the likelihood of each state at each time is calculated by each of the first model and the second model, and the likelihoods calculated by the both models are taken into consideration, and therefore state allocation in the state sequence is appropriately updated.

In the state estimation device according to another embodiment, the output unit may output the state sequence where the state label at each time is updated.

According to the above embodiment, an accurate state sequence estimated by the first model and the second model is obtained.

In the state estimation device according to another embodiment, the state allocation unit may allocate the state label to each time and one or more types of sensor data associated with the time based on random numbers.

According to the above embodiment, a provisional state sequence suitable for the learning of the first model and the second model is obtained.

In the state estimation device according to another embodiment, the second model learning unit may generate information indicating transition of the state labels as the input feature quantity in the learning data by compressing a time-series sequence of state labels before the transition reference time by a specified means.

According to the above embodiment, the size of the input feature quantity to be used for the learning of the second model is reduced, which enables load reduction in the learning processing of the second model.

Further, to solve the above-described problem, a state estimation program according to one embodiment of the present invention is a state estimation program causing a computer to function as a state estimation device for estimating a user's state based on sensor data detected by a sensor, the program causing the computer to implement a sensor information acquisition function to acquire sensor information composed of time-series sensor data acquired by at least one sensor, a state allocation function to provisionally allocate one of state labels for identifying each of user's states to each time and one or more types of sensor data associated with the time by a specified means, a first model learning function to calculate a feature parameter indicating a feature of sensor data to which the same state label is allocated, and perform learning of a first model that classifies the sensor data associated with each time into any one of a plurality of states, a second model learning function to extract, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and perform learning of a second model whose input is transition of state labels before the transition reference time and whose output is a state label at a time subsequent to the transition reference time by machine learning based on learning data including the extracted input feature quantity and the extracted supervision label, a state allocation update function to estimate a state at each time based on each of the first model and the second model for each time in the time series, and update a state label allocated to each time based on each estimated state, and an output function to output the first model and the second model when specified conditions for update of the state labels are satisfied.

According to the program of the above-described embodiment, based on a state sequence, which is a sequence of state labels provisionally allocated to sensor data acquired in a times series, a first model that classifies sensor data associated with each time into any one of a plurality of states is built by unsupervised learning that calculates a feature parameter of sensor data to which the same state label is allocated, and also a second model that estimates a subsequent state based on the transition of states in a time series is built. Then, the state sequence representing the transition of states is updated based on estimation results of states output by each of the first model and the second model, and the learning of the first model and the second model is performed based on the updated state sequence, and therefore accurate estimation of states and building of a model for estimating a user's state are achieved with no need for a user to input information about states to be used for learning.

To solve the above-described problem, an estimation model according to one embodiment of the present invention is a learned estimation model causing a computer to function to estimate a user's state in a state estimation device for estimating a user's state based on sensor data detected by a sensor, wherein the estimation model includes a first model and a second model, the first model is a model that classifies one or more types of sensor data associated with each time into any one of a plurality of states, the first model is constructed by unsupervised learning that calculates a feature parameter indicating a feature of sensor data associated with time to which the same state label is allocated based on each time and one or more types of sensor data associated with the time, to which one of state labels for identifying a user's state is allocated based on sensor information composed of time-series sensor data acquired by at least one type of sensor, the second model is constructed by extracting, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and performing machine learning based on learning data including the extracted input feature quantity and the extracted supervision label, the second model is a model whose input is transition of states before the transition reference time and whose output is a state at a time subsequent to the transition reference time, and a state at each time is estimated based on each of the first model and the second model for each time in the time series, and learning of each of the first model and the second model is performed based on the state label at each time updated based on each estimated state.

According to the above-described embodiment, based on a state sequence, which is a sequence of state labels provisionally allocated to sensor data acquired in a times series, a first model that classifies sensor data associated with each time into any one of a plurality of states is built by unsupervised learning that calculates a feature parameter of sensor data to which the same state label is allocated, and also a second model that estimates a subsequent state based on the transition of states in a time series is built. Then, the state sequence representing the transition of states is updated based on estimation results of states output by each of the first model and the second model, and the learning of the first model and the second model is performed based on the updated state sequence, and therefore a model capable of accurate estimation of states is obtained with no need for a user to input information about states to be used for learning.

A state estimation method according to one embodiment of the present invention is a state estimation method in a state estimation device for estimating a user's state based on sensor data detected by a sensor, the method including a sensor information acquisition step of acquiring sensor information composed of time-series sensor data up to present time acquired by at least one type of sensor, a state prediction step of inputting the sensor information to the above-described estimation model, and acquiring the state sequence being a sequence of the state labels indicating transition of states up to the present time, and an output step of outputting the state sequence acquired in the state prediction step.

A state estimation device according to one embodiment of the present invention is a state estimation device for estimating a user's state based on sensor data detected by a sensor, the device including a sensor information acquisition unit configured to acquire sensor information composed of time-series sensor data up to present time acquired by at least one type of sensor, a state prediction unit configured to input the sensor information to the above-described estimation model, and acquire the state sequence being a sequence of the state labels indicating transition of states up to the present time, and an output unit configured to output the state sequence acquired in the state prediction unit.

According to the above-described embodiment, the state sequence indicating transition of states up to the present time is output by inputting the time-series sensor data to the above-described estimation model, and therefore an accurately estimated user's state is obtained.

Further, in the state estimation method according to another embodiment, the state prediction step inputs the state sequence being a sequence of the state labels up to the present time to the second model of the estimation model, and acquires the state label at a time subsequent to the present time, and the output step outputs the state label at a time subsequent to the present time acquired in the state prediction step.

According to the above-described embodiment, the state label at a time subsequent to the present time is output by inputting the state sequence up to the present time to the second model, and therefore accurate prediction of a user's state after the present time is achieved.

Further, in the state estimation device according to another embodiment, the state prediction unit performs specified data mining on a plurality of state sequences acquired by inputting the sensor information of each of a plurality of users to the estimation model and acquires a predetermined number of patterns of state sequences whose frequency of occurrence is high, and the output unit outputs the predetermined number of patterns of state sequences.

According to the above-described embodiment, a state sequence where time-series sensor data are represented by information with one variable as a sequence of state labels is used for data mining, and a predetermined number of patterns of state sequences obtained by the data mining are output, and therefore provision of significant and easily interpretable information is achieved.

Although the present embodiment is described in detail above, it is apparent to those skilled in the art that the present embodiment is not restricted to the embodiment described in this specification. The present embodiment can be implemented as a modified and changed form without deviating from the spirit and scope of the present invention defined by the appended claims. Accordingly, the description of the present specification is given merely by way of illustration and does not have any restrictive meaning to the present embodiment, Further, each aspect/embodiment described in the present specification may be applied to LTE (Long Term Evolution), LTE-A (LTE Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), a system using another appropriate system and/or a next generation system extended based on these systems.

The procedure, the sequence, the flowchart and the like in each aspect/embodiment described in this specification may be in a different order unless inconsistency arises. For example, for the method described in this specification, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each aspect/embodiment described in the present specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiment described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure, Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and/or the term needed to understand the present specification may be replaced by a term having the same or similar meaning.

The terms "system" and "network" used in the present specification are used to be compatible with each other.

Further, information, parameters and the like described in the present specification may be represented by an absolute value, a relative value to a specified value, or corresponding different information.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The description "based on" used in the present disclosure does not mean "based only on" unless otherwise noted. In other words, the description "based on" means both of "based only on" and "based at least on".

When the terms such as "first" and "second" are used in this specification, any reference to the element does not limit the amount or order of the elements in general. Those terms can be used in this specification as a convenient way to distinguish between two or more elements. Thus, reference to the first and second elements does not mean that only two elements can be adopted or the first element needs to precede the second element in a certain form.

As long as "include", "including" and transformation of them are used in the present specification or claims, those terms are intended to be comprehensive like the term "comprising". Further, the term "or" used in the present specification or claims is intended not to be exclusive OR.

In this specification, reference to a device includes both one and more than one of such devices unless it is obviously singular contextually or technically.

In the entire present disclosure, the singular includes the plural except where otherwise clearly indicated by context.

REFERENCE SIGNS LIST

1 . . . state estimation system, 10 . . . state estimation device, 11 . . . sensor information acquisition unit, 12 . . . state allocation unit, 13 . . . first model learning unit, 14 . . . second model learning unit, 15 . . . state allocation update unit, 16 . . . output unit, 17 . . . state prediction unit, 20 . . . sensor information storage unit, 30 . . . state allocation storage unit, 40 . . . first model storage unit, 50 . . . second model storage unit, M1 . . . recording medium, m10 . . . main module, m11 . . . sensor information acquisition module, m12 . . . state allocation module, m13 . . . first model learning module, m14 . . . second model learning module, m15 . . . state allocation update module, m16 . . . output module, m17 . . . state prediction module, P1 . . . state estimation program

The invention claimed is:

1. A state estimation device for estimating a user's state based on sensor data detected by a sensor, the state estimation device comprising circuitry configured to:
   acquire sensor information composed of time-series sensor data acquired by at least one sensor;
   provisionally allocate one of state labels for identifying each of user's states to each time and one or more types of sensor data associated with the time;
   calculate a feature parameter indicating a feature of a plurality of sensor data to which a same state label is allocated, and perform learning of a first model that classifies the sensor data associated with each time into any one of a plurality of states;
   extract, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and perform learning of a second model whose input is transition of state labels before the transition reference time and whose output is a state label at a time subsequent to the transition reference time by machine learning based on learning data including the extracted input feature quantity and the extracted supervision label;
   estimate a state at each time based on each of the first model and the second model for each time in the time series, and update a state label allocated to each time based on each estimated state; and
   output the first model and the second model when specified conditions for update of the state labels are satisfied.

2. The state estimation device according to claim 1, wherein the feature parameter includes at least one of an average and a variance-covariance matrix of the one or more types of sensor data.

3. The state estimation device according to claim 2, wherein the circuitry calculates a likelihood of each state at each time in the time series based on each of the first model and the second model, and updates the state label allocated to each time based on the calculated likelihoods of each state at each time.

4. The state estimation device according to claim 1, wherein the circuitry calculates a likelihood of each state at each time in the time series based on each of the first model and the second model, and updates the state label allocated to each time based on the calculated likelihoods of each state at each time.

5. The state estimation device according to claim 1, wherein the circuitry outputs the state sequence where the state label at each time is updated.

6. The state estimation device according to claim 1, wherein the circuitry performs the provisional allocation of the one of state labels for identifying each of user's states to each time and the one or more types of sensor data associated with each time based on random numbers.

7. The state estimation device according to claim 1, wherein the circuitry generates information indicating transition of the state labels as the input feature quantity in the learning data by compressing a time-series sequence of state labels before the transition reference time by a specified means.

8. A state estimation method in a state estimation device for estimating a user's state based on sensor data detected by a sensor, comprising:
   a sensor information acquisition step of acquiring sensor information composed of time-series sensor data up to present time acquired by at least one type of sensor;
   a state prediction step of inputting the sensor information to an estimation model, and acquiring a state sequence being a sequence of state labels indicating transition of states up to the present time; and
   an output step of outputting the state sequence acquired in the state prediction step, wherein
   the estimation model causes a computer to function to estimate a user's state in a state estimation device for estimating a user's state based on sensor data detected by a sensor,
   the estimation model includes a first model and a second model,
   the first model is a model that classifies one or more types of sensor data associated with each time into any one of a plurality of states,
   the first model is constructed by unsupervised learning that calculates a feature parameter indicating a feature of a plurality of sensor data associated with time to which a same state label is allocated based on each time and one or more types of sensor data associated with each time, to which one of state labels for identifying a user's state is allocated based on sensor information composed of time-series sensor data acquired by at least one type of sensor,
   the second model is constructed by extracting, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and performing machine learning based on learning data including the extracted input feature quantity and the extracted supervision label,
   the second model is a model whose input is transition of states before the transition reference time and whose output is a state at a time subsequent to the transition reference time, and
   a state at each time is estimated based on each of the first model and the second model for each time in the time series, and learning of each of the first model and the second model is performed based on the state label at each time updated based on each estimated state.

9. The state estimation method according to claim 8, wherein
   the state prediction step inputs the state sequence being a sequence of the state labels up to the present time to the second model of the estimation model, and acquires a state label at a time subsequent to the present time, and
   the output step outputs the state label at a time subsequent to the present time acquired in the state prediction step.

10. A state estimation device for estimating a user's state based on sensor data detected by a sensor, the state estimation device comprising circuitry configured to:
    acquire sensor information composed of time-series sensor data up to present time acquired by at least one type of sensor;

input the sensor information to an estimation model, and acquire a state sequence being a sequence of the state labels indicating transition of states up to the present time; and output the state sequence acquired by the circuitry, wherein the estimation model causes a computer to function to estimate a user's state in a state estimation device for estimating a user's state based on sensor data detected by a sensor, the estimation model includes a first model and a second model, the first model is a model that classifies one or more types of sensor data associated with each time into any one of a plurality of states, the first model is constructed by unsupervised learning that calculates a feature parameter indicating a feature of a plurality of sensor data associated with time to which a same state label is allocated based on each time and one or more types of sensor data associated with each time, to which one of state labels for identifying a user's state is allocated based on sensor information composed of time-series sensor data acquired by at least one type of sensor, the second model is constructed by extracting, from a state sequence being a time-series sequence of the state labels allocated to each time, information indicating transition of the state labels before a transition reference time being one time point in the time series and a state label allocated to a time subsequent to the transition reference time as an input feature quantity and a supervision label, respectively, and performing machine learning based on learning data including the extracted input feature quantity and the extracted supervision label, the second model is a model whose input is transition of states before the transition reference time and whose output is a state at a time subsequent to the transition reference time, and a state at each time is estimated based on each of the first model and the second model for each time in the time series, and learning of each of the first model and the second model is performed based on the state label at each time updated based on each estimated state.

11. The state estimation device according to claim 10, wherein the circuitry performs specified data mining on a plurality of state sequences acquired by inputting the sensor information of each of a plurality of users to the estimation model, and acquires a predetermined number of patterns of state sequences whose frequency of occurrence is high, and the circuitry outputs the predetermined number of patterns of state sequences.

\* \* \* \* \*